Patented Aug. 14, 1951

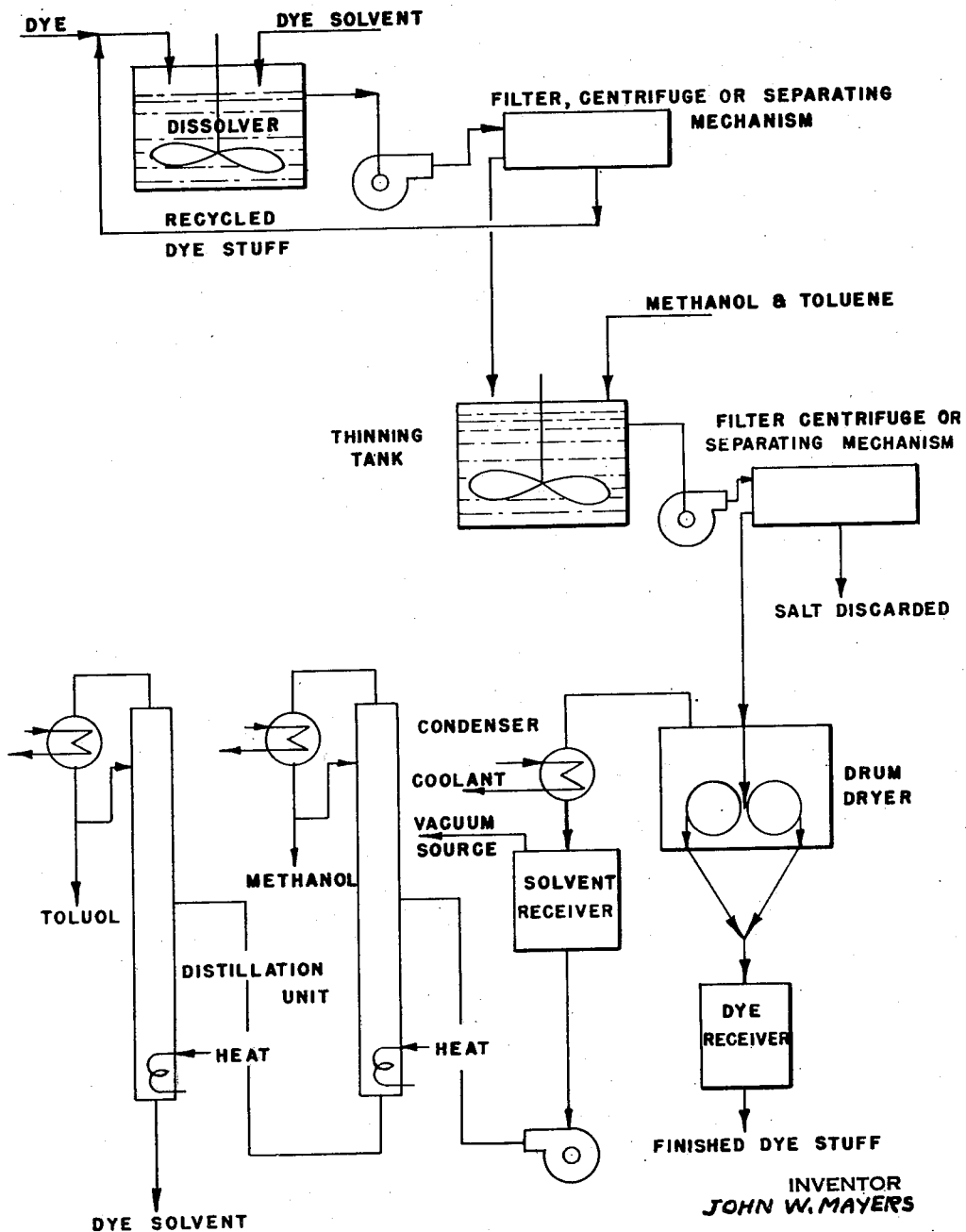

2,564,225

UNITED STATES PATENT OFFICE 2,564,225

DYESTUFF PURIFICATION

John W. Mayers, Dayton, Ohio, assignor to Chadeloid Corporation, Wilmington, Del., a corporation of Delaware Application August 7, 1946, Serial No. 688,922

2 Claims. (Cl. 260—205)

This invention deals with a method of purifying organic dyestuffs, and in particular with a method of removing inorganic salts from dyestuffs.

In manufacturing acid organic dyestuffs, it is customary to precipitate these dyes from their solutions as the sodium sulfonate salts. This precipitation is usually effected by the addition of sodium chloride, sodium sulfate or other inorganic sodium salts to an aqueous solution of the sulfonic acid of the dye. Since, in order to obtain complete precipitation, an excess of the sodium salt has always to be added, the precipitated dyes are contaminated by such an excess of the inorganic sodium salts. It is even customary purposely to employ an essential surplus of inorganic sodium salt, which means to employ a predetermined quantity beyond the stoichiometric amount required, this for the purpose of obtaining dyes of the same and thus comparable standard.

It is an object of this invention to provide a process for eliminating inorganic sodium salt from acid organic dyestuffs.

It is another object of this invention to provide a continuous process by which a pure acid organic dyestuff, in particular a dyestuff free from inorganic sodium salt, is obtained.

These and other objects are accomplished by first forming a saturated solution of the dyestuff to be purified, then removing any solid matter by mechanical means, thereafter diluting the saturated solution filtered off whereby any inorganic salt present is precipitated, and finally removing the precipitate by mechanical means.

For forming the saturated solution of the dyestuff, all kinds of organic solvents are usable. Thus, for example, ethers of diethylene glycol, ethylene glycol monoethyl ether derivatives, glycol derivatives, amines, such as ethanolamines, diacetone alcohol, furfuryl alcohol, tetrahydrofurfural alcohol, amino propanol derivatives and homologues were found operative for the process of my invention. Thinners advantageous for precipitating the inorganic sodium salts are advantageously composed of an alcohol and an aromatic compound. A mixture of two volumes of methanol per one volume of the saturated dye solution and one volume of toluol, for instance, gave satisfactory results. However, other alcohols, for example, propyl alcohol, and other aromatics such as benzene, furfuryl alcohol, naphtha, xylol and others may be used with equal satisfaction.

It will be understood that for shipping and storing purposes, the purified dye solution may be evaporated until a dry crystallized product is obtained. This step of evaporation is preferably carried out in vacuum in order to prevent decomposition of the product.

Instead of using an organic solvent for the production of the saturated dye solution, water may also be used. In this case, the thinner or diluent need not contain aromatic compounds; an alcohol alone suffices in this instance.

In the following, a few examples are given in order to illustrate, but not to limitate the invention.

Example I

| | Pounds |
|---|---|
| Chromolan Yellow NGR PR 316 (NAC) | 25 |
| Diethylene glycol monoethyl ether | 125 |
| Methanol | 250 |
| Toluene | 125 |

Example II

| | Pounds |
|---|---|
| Azo Yellow A5W Color Index 146 (NAC) | 25 |
| Furfuryl alcohol | 250 |
| Propyl alcohol | 500 |
| Xylol | 200 |

Example III

| | Pounds |
|---|---|
| Chromolan Orange R PR 146 (NAC) | 25 |
| Water | 250 |
| Methanol | 600 |

The procedure in each of these cases was the same. The attached flow sheet gives a diagrammatic illustration of the process suitable for carrying out the invention. It will be seen from this flow sheet that the dye first enters a tank to which a solvent is added. A stirring device provides for a thorough distribution and thus for a rapid dissolving process. After the solution is saturated, it is pumped into a filtering device, centrifuge or other separating mechanism wherein any solid matter is removed. The solid matter may be returned to the cycle and be mixed again with solvent in the dissolver. The saturated solution is fed into a thinning tank where, in the example illustrated, a mixture of methanol and toluene is added to it. In this thinning tank the precipitation of the contaminating inorganic sodium salt takes place. After precipitation, the mixture of dye solution and precipitate is pumped into a second filter or analogous separating device where the precipitated salt is removed and thus a pure dyestuff solution is obtained. This dyestuff solution is then guided over a drum drier where the solvent is evaporated and a dry finished dyestuff product is obtained.

The solvent evaporated in the drum drier is sent into a recovery system. This system comprises a condenser in which a coolant circulates, a solvent receiver for collecting the condensed solvent, and two or more fractionating columns. The recovered solvents may then be returned to the process.

It will be understood that this flow sheet merely gives one embodiment of the invention by way of example without limiting the invention thereto.

It will be also understood that while there have been described herein certain specific embodiments of the invention, it is not intended thereby to have it limited to or circumscribed by the details given, since the invention is susceptible to various modifications and changes which come within the spirit of the disclosure and the scope of the appended claims.

I claim:

1. In a method of purifying water soluble organic acid dyestuffs contaminated by inorganic salts, the steps of (a) dissolving from 25 to 50 lbs. of a water soluble dyestuff to be treated in 125 to 250 lbs. of a glycol ether to form a saturated solution; (b) filtering said saturated solution to remove any solid matter; (c) adding to said saturated filtered solution a mixture of from 250 to 500 lbs. of an aliphatic alcohol having not more than three carbon atoms and from 125 to 250 lbs. of an aromatic hydrocarbon selected from the group consisting of benzene, toluol, naphtha and xylol whereby said inorganic salts precipitate; and (d) removing said precipitated matter by mechanical means.

2. In a method of purifying organic acid dyestuffs contaminated by inorganic salts, the steps of (a) dissolving 25 lbs. of Chromolan Yellow NGR in 125 lbs. of diethylene glycol monoethyl ether; (b) filtering the saturated solution formed in step (a) to remove any solid matter; (c) adding to said saturated filtered solution about 250 lbs. of methanol and 125 lbs. of toluol whereby said inorganic salts precipitate; and (d) removing said precipitated matter by mechanical means.

JOHN W. MAYERS.

REFERENCES CITED

The following references are of record in the file of this patent:

UNITED STATES PATENTS

| Number | Name | Date |
|---|---|---|
| 2,254,372 | Kvalnes | Sept. 2, 1941 |
| 2,414,418 | Lofton | Jan. 14, 1947 |

OTHER REFERENCES

Cheronis—Semimicro and Macro Organic Chemistry (1942), publisher Thomas Y. Crowell Co., New York, pages 24, 25, 27.

MacArdle—Solvents in Synthetic Organic Chemistry, D. Van Nostrand Co., New York, N. Y., pages 151, 78, 16, 123, 124, 165, 4.